(12) United States Patent
Vargas Duenas

(10) Patent No.: US 9,182,074 B2
(45) Date of Patent: Nov. 10, 2015

(54) CAP HOLDER WITH MAGNET

(71) Applicant: Jose Alfredo Vargas Duenas, Tamaulipas (MX)

(72) Inventor: Jose Alfredo Vargas Duenas, Tamaulipas (MX)

(*) Notice: Subject to any disclaimer, the term of this patent is extended or adjusted under 35 U.S.C. 154(b) by 118 days.

(21) Appl. No.: 13/928,379

(22) Filed: Jun. 27, 2013

(65) Prior Publication Data
US 2014/0001323 A1    Jan. 2, 2014

(30) Foreign Application Priority Data

Jun. 29, 2012  (MX) .................. MX/A/2012/008299

(51) Int. Cl.
*A47G 25/10* (2006.01)
*F16M 13/02* (2006.01)

(52) U.S. Cl.
CPC ............... *F16M 13/02* (2013.01); *A47G 25/10* (2013.01)

(58) Field of Classification Search
USPC ......... 248/690, 692, 301, 303, 304, 339, 305; 223/120, 85, DIG. 2
See application file for complete search history.

(56) References Cited

U.S. PATENT DOCUMENTS

| 4,805,782 | A | * | 2/1989 | Hale et al. | 211/30 |
| 5,411,231 | A | * | 5/1995 | Buck | 248/206.5 |
| 5,725,134 | A | * | 3/1998 | Weltge | 223/24 |
| 6,672,551 | B2 | * | 1/2004 | Rivellino et al. | 248/206.5 |
| 2007/0170329 | A1 | * | 7/2007 | Li | 248/304 |
| 2009/0294623 | A1 | * | 12/2009 | Pinchuk | 248/546 |
| 2010/0163696 | A1 | * | 7/2010 | Briggs et al. | 248/206.5 |
| 2012/0024808 | A1 | * | 2/2012 | Jackson et al. | 211/85.7 |
| 2013/0313387 | A1 | * | 11/2013 | Ly | 248/205.3 |

* cited by examiner

*Primary Examiner* — Alfred J Wujciak
(74) *Attorney, Agent, or Firm* — Defillo & Associates, Inc.; Evelyn A. Defillo

(57) ABSTRACT

The cap holder with magnet according to the present invention includes a base that serves to place caps, hats, visors, or articles having similar characteristics for their care, display, storage, or to keep them in order. A magnet is attached to the base or bottom section of the base. A protrusion is formed on the back section of the base. Inward curves are formed on the back section of the base. A hook may also be attached to the back section of the base to allow to vertically use the cap holder with magnet.

2 Claims, 4 Drawing Sheets

CAP HOLDER WITH MAGNET

OBJECT OF THE INVENTION

The present invention which I intend to protect by means of this application as indicated in the description refers to an object which can place any type of hat, cap, visor or article of similar characteristics to its care, display, storage, or simply to keep them in order, in which the main feature carries a magnet at the base which can be stuck to any object, wall, furniture, or vehicle that includes a metallic surface or part, to which a magnet can adhere.

BACKGROUND OF THE INVENTION

Several cap holders are known, some of them are used to place caps, hats, visors, or articles with similar characteristics over or inside them, others cap holders that serve to hang them by using tweezers or hooks, and other cap holders shaped as shelves, which include projections or openings in its forms, which are hung or placed on top of them, and a few others with a performance like some of them. They are made of plastic, wood, metal, but none of the known cap holders has the advantage offered by a cap holder having a magnet, as its name says, has a magnet placed on its base or bottom part by means, by which it may be adhered to any surface or metal part on which a magnet can be adhered. In addition, the cap holder includes a protuberance and inward curves on its back section which helps to maintain the cap, hat, visor, or similar article, placed on the cap holder with the magnet even when it is in a vertical position. Also includes an optional hook on the back section, from which may be hung from any attachment or part where you can place the hook and by its general shape helps the cap, hat, visor, or article of similar characteristics to be maintained in good condition by the adopted position and can be used by its shape practically in almost all sizes, styles, models, and other features of the same. The cap holder with magnet may be manufactured in any type of plastic and its derivatives or any other material having similar characteristics or any material that by its physical characteristics may take the form of this attachment and to fulfill its purpose.

DESCRIPTION DETAILED OF THE INVENTION

Figure 1:
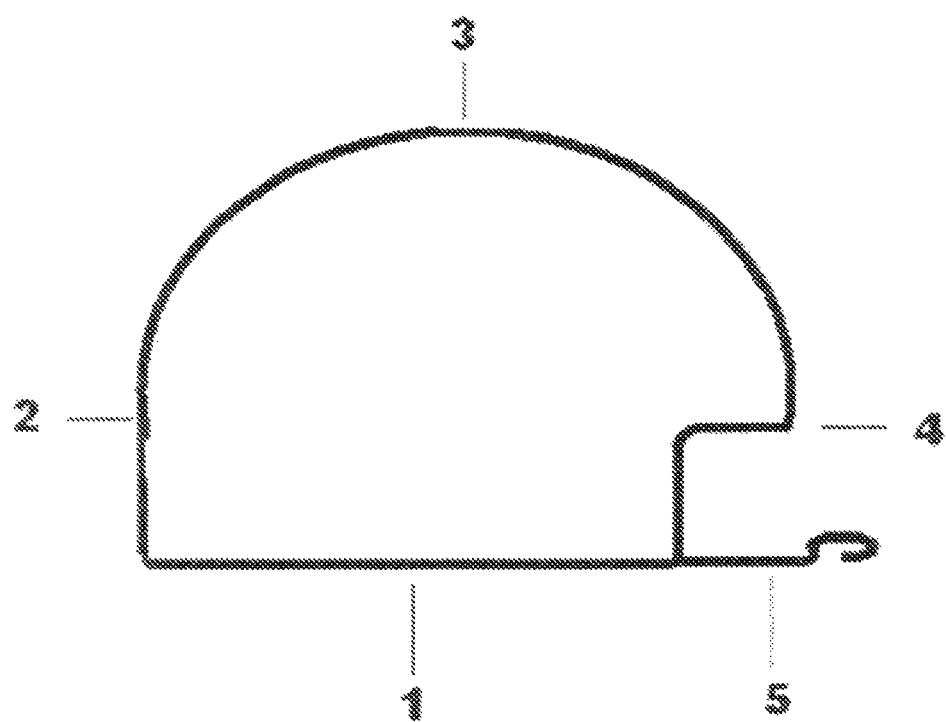
FIG. 1 shows a side view in the horizontal position of the cap holder with magnet, showing numbered, with the number 1 as the base or magnet area, with the number 2 as the front section, with the number 3 as the top section, with the number 4 as the protuberance, and with the number 5 as the hook.
Figure 2:
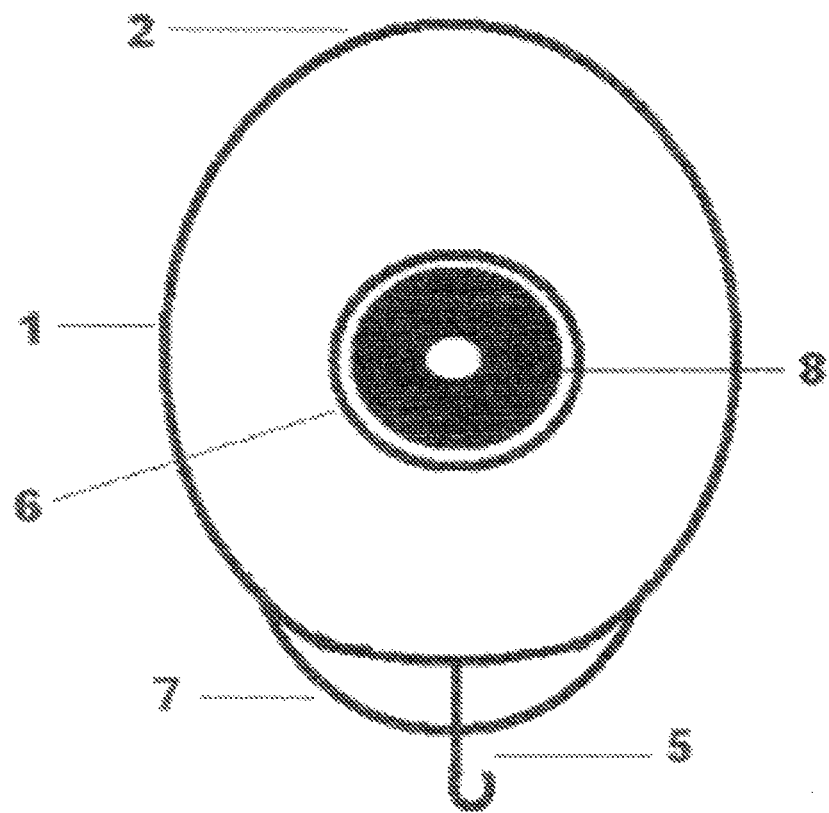
FIG. 2 shows a bottom view of the of the cap holder with magnet, showing numbered, with the number 1 as the base or magnet area, with the number 2 as the front section, with the number 5 as the hook, with the number 6 as the cavity (the cavity drawing, which may vary according to the shape of the magnet to be used, shows, as an example, using a magnet in the form of a ring or round with a central perforation), with the number 7 as the protuberance and with the number 8 as the magnet (as example, it shows a magnet having a ring shape or round perforated, which may be changed).
Figure 3:
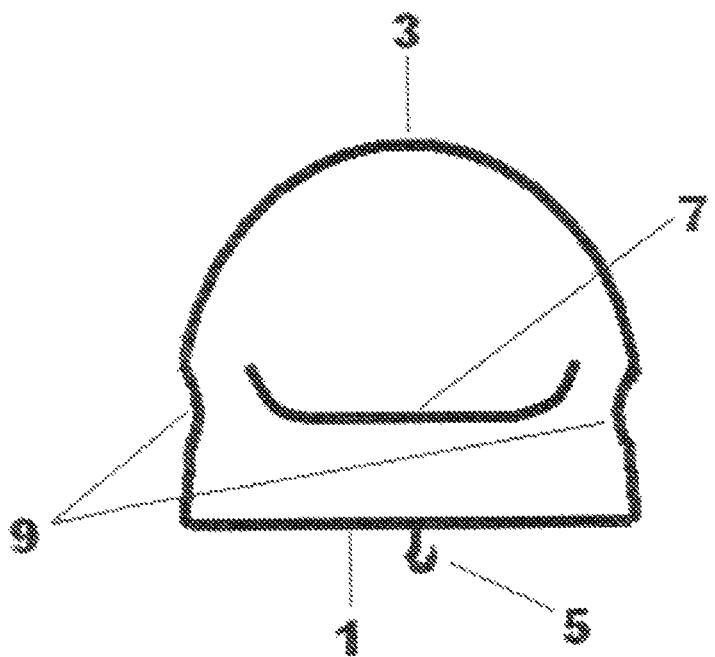
FIG. 3 shows a rear view of the cap holder with magnet, showing numbered, with the number 1 as the base or the magnet area, with the number 3 as the top section, with the number 5 as the hook, with the number 7 as the protrusion, and with the number 9 as inward curves.
Figure 4:
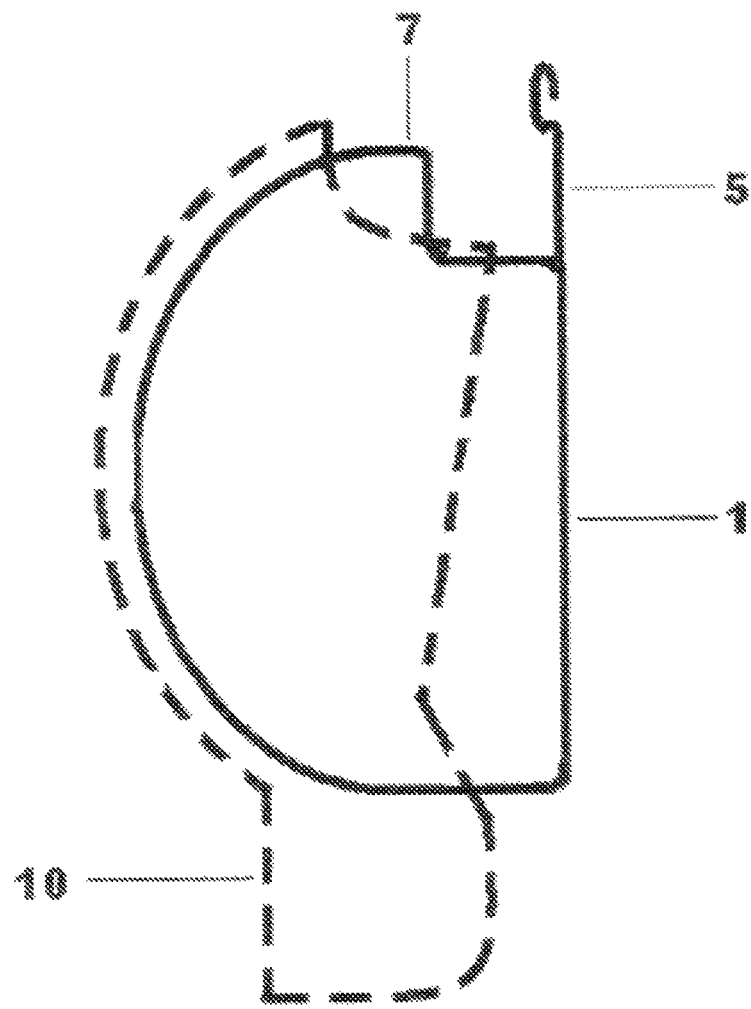
FIG. 4 shows a lateral view of the cap holder with magnet placed in a vertical position, which includes a cap drawn with dashed lines, showing how it works in that position, showing numbered, with the number 1 as the base or the magnet area, with the number 5 as the hook, with the number 7 as the protrusion, and with the number 10 as the cap.

The cap holder with magnet, it was designed in order to keep the caps, hats, visors, or articles of similar characteristics (10) in an attachment which could be placed to care, display, save, or help maintain the order of said item in homes, classrooms, work areas, fun areas, vehicles, and anywhere in general. The cap holder with magnet has as its purpose not only to keep the cap, hat, visor, or any article having similar characteristics (10) visible, but can be placed on its base (1) in a vertical position (FIG. 4) making to adhere through the magnet (8) at the bottom section (FIG. 2) to a door, furniture, locker, rack, wall, shelf, archive, vehicle, or any other object that has a metallic surface or part on which may be adhered a magnet (8), so it may move or relocate as is convenient to the user without the use of any tool, and without damaging the surface of them. Having in addition the cap holder with magnet a protuberance (7) and inward curves (9) on the rear section (FIG. 3) which helps to keep the cap, hat, visor, or article of similar characteristics (10) on the cap holder with magnet even and when they are in a vertical position (FIG. 4). The cap holder because its general shape helps the cap, hat, visor, or article of similar characteristics (10) to be kept in good condition by the adopted position and can be used by its shape practically for sizes, styles, models, and other characteristics of the same. In addition, the cap holder with magnet by its shape may be used by placing it on its base (1), in a horizontal position (FIG. 1), over some furniture, shelf, rack, bookshelf, or also in a vertical position (FIG. 4), by means of the optional hook (5) according to the material that is manufactured the cap holder with magnet, in any object, furniture or vehicle having an attachment or part in which the hook (5) can be placed.

The hook (5) is preferably used to hang the cap holder with magnet of the present invention, however, as a further embodiment, the hook may be removed and a hole (not shown) may be made in the bottom where is the magnet. The hole may be use to hang the cap holder with magnet of the present invention.

The cap with magnet may be made of any type of plastics and derivatives, or any other material having similar characteristics, or any other material that by its physical characteristics may take the form of this holder and that to fulfill its purpose, in various sizes, colors, textures, weights, and other features according to the needs of elaboration of the user.

In the base (1) may be placed and use magnets (8) of different shapes, sizes, materials, and other characteristics in general, available on the market according to the need of strength, magnetism or attractive force necessary in the manufacture of cap holder with magnet. The magnet (8) is adhered with glue in a cavity (6) located on the base (1) according to the sizes and shapes of the magnet (8) to be used or glued shaped in a flat shaped upon the base (1) in case of using a magnet (8) in the form of a magnetic strip, according to the manufacturing needs or the user. The manufacture of the cap holder with magnet may be done by different form elaboration options and shapes in plastic molding, blow molding, injection, compression, transfer or extrusion, according to the manufacturing needs, the client, or availability in the market.

What is claimed is:

1. A cap holder consisting of:

base having a perimeter with semicircular shape, the base including a front section, a back section, a bottom section, a top section, and a protuberance projecting away from the perimeter of the base;

a cavity located on the bottom section of the base;

a magnet secured to the cavity;

an L-shaped inward curve running from an end of the protuberance towards the back section of the base;

the base is adapted to receive a cap, a hat, or a visor;

the cap holder is adapted to be secured to a metallic surface.

2. A cap holder consisting of:

base having a perimeter with semicircular shape, the base including a front section, a back section, a bottom section, a top section, and a protuberance projecting away from the perimeter of the base;

a cavity located on the bottom section of the base;

a magnet secured to the cavity;

an L-shaped inward curve running from an end of the protuberance towards the back section of the base;

a hook attached to an edge of the L-shaped inward curve on the back section of the base;

the base is adapted to receive a cap, a hat, or a visor;

the cap holder adapted to be secured to a surface by using the hook.

* * * * *